No. 734,550. Patented July 28, 1903.

UNITED STATES PATENT OFFICE.

FRANK H. HAYES, OF HAMILTON, OHIO.

FEED-TROUGH FOR ANIMALS.

SPECIFICATION forming part of Letters Patent No. 734,550, dated July 28, 1903.

Application filed November 26, 1902. Serial No. 132,915. (No model.)

*To all whom it may concern:*

Be it known that I, FRANK H. HAYES, a citizen of the United States, residing at Hamilton, in the county of Butler and State of Ohio, have invented certain new and useful Improvements in Feed-Troughs for Animals; and I do declare the following to be a full, clear, and exact description of the invention, such as will enable others skilled in the art to which it appertains to make and use the same.

The invention has relation to feed-troughs for animals, and more especially to that class of troughs adapted to be secured in the stalls and automatically supply feed to the animal in small quantities to prevent the animal eating too fast, which is very injurious.

The object of the invention is to provide a trough of this character which shall be simple of construction, durable in use, and comparatively inexpensive of production and one which may be easily attached to the end of the stall and removed therefrom and which shall be of such construction as to prevent the animal getting access to the feed-hopper.

With this object in view the invention consists in certain features of construction and combination of parts, which will be hereinafter fully described and claimed.

In the drawings, Figure 1 is a perspective view of the end wall of the stall, illustrating the application of my invention. Fig. 2 is a longitudinal sectional view. Fig. 3 is a transverse sectional view. Fig. 4 is a sectional view through one arm of a supporting-bail and the lock with which it engages.

In the drawings the same reference characters indicate the same parts of the invention.

1 denotes the end of the stall, provided with legs or castings 2, having recesses 3.

4 denotes the feed-trough, a portion of which is provided with a sliding partition 5 to form a feed-hopper 6, which is provided with a hinged door 7, having a finger-recess 8, by means of which it may be raised for the purpose of charging it with feed. There is nothing that projects from this door, and for this reason the animal cannot raise it and get access to the contents within the compartment. The partition slides in grooves 9 and is held in vertical adjustment by a cross-bolt 10, which extends through the sides of the feed-hopper and serves also as a stop for the door.

The forward side of the trough is provided with a longitudinal cleat or rib 11.

12 denotes a bail which is adapted to embrace the front side and ends of the trough. The ends of this bail are bent laterally and are sprung into the recesses of the legs or castings 2. The forward or longitudinal portion of the bail rests against the lower edge of the cleat or rib and prevents the trough from slipping downwardly.

In operation the feed is placed within the hopper and the partition is adjusted to discharge the desired amount of feed into the trough from which the animal eats. Now by tightening the bolt the sides of the trough will be drawn together, thus firmly clamping the partition in its adjusted position and preventing the animal raising the partition with his teeth. If desired, only that portion of the trough from which the animal eats may be arranged within the stall, as the hopper portion may be located on the outside of the stall, thus permitting the feed to be supplied to the animal without danger or trouble of passing around between the animal and the sides of the stall.

If it be desired to change or remove the box and place it in position in another stall, the box is disengaged from the bail and the ends of the bail sprung from engagement with the castings or legs. The entire device may now be taken to another point in the stable and engaged with corresponding legs or castings in another stall.

It will of course be understood that various changes in the form, proportion, and the minor details of construction may be resorted to without departing from the principle or sacrificing any of the advantages of this invention.

Having thus described the invention, what is claimed, and desired to be secured by Letters Patent, is—

The combination with fixed legs provided with recesses in their adjacent edges, of a feed-trough provided on its forward edge with No. 734,550. PATENTED JULY 28, 1903.
F. H. HAYES.
FEED TROUGH FOR ANIMALS.
APPLICATION FILED NOV. 26, 1902.
NO MODEL.
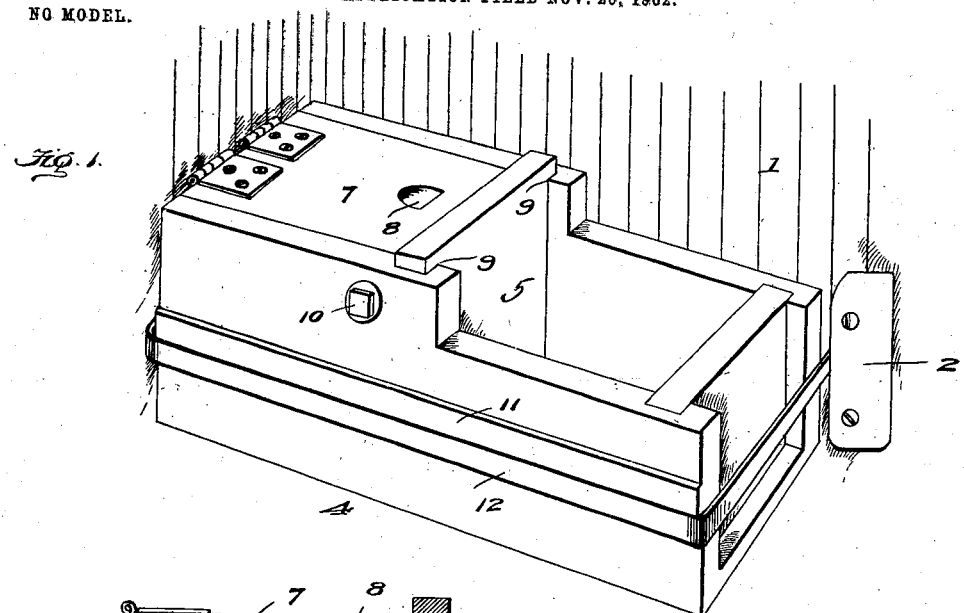
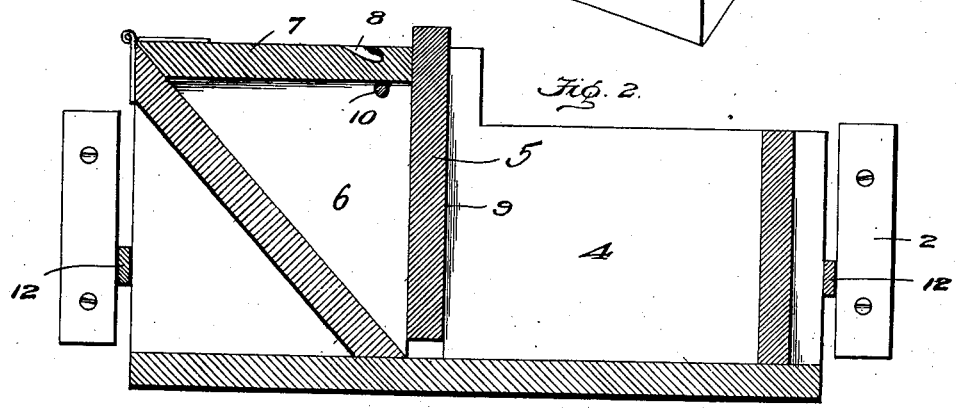
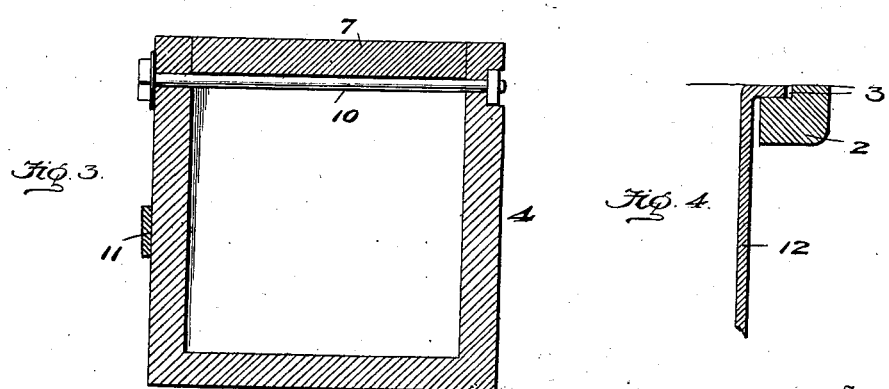
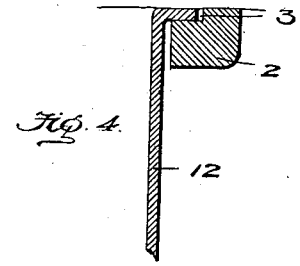
Witnesses
Inventor
F. H. Hayes
By
Attorneys
THE NORRIS PETERS CO., PHOTO-LITHO., WASHINGTON, D. C.